US009586840B2

(12) United States Patent
Hsieh et al.

(10) Patent No.: US 9,586,840 B2
(45) Date of Patent: Mar. 7, 2017

(54) SYSTEMS AND METHODS FOR CLUSTERING PARTICLES BY LIQUID-PHASE ELECTRIC PLASMA DISCHARGE

(71) Applicant: Georgia Tech Research Corporation, Atlanta, GA (US)

(72) Inventors: Jeffery S. Hsieh, Marietta, GA (US); Alexander T. Jordan, Broad Run, VA (US); Daniel T. Lee, Rochester, MN (US)

(73) Assignee: Georgia Tech Research Corporation, Atlanta, GA (US)

( * ) Notice: Subject to any disclaimer, the term of this patent is extended or adjusted under 35 U.S.C. 154(b) by 935 days.

(21) Appl. No.: 13/866,012

(22) Filed: Apr. 18, 2013

(65) Prior Publication Data

US 2014/0151938 A1   Jun. 5, 2014

Related U.S. Application Data

(60) Provisional application No. 61/625,859, filed on Apr. 18, 2012.

(51) Int. Cl.
*C02F 1/32* (2006.01)
*C02F 1/463* (2006.01)
(Continued)

(52) U.S. Cl.
CPC ............ *C02F 1/463* (2013.01); *C02F 1/4608* (2013.01); *C02F 1/36* (2013.01); *C02F 2101/308* (2013.01); *C02F 2103/28* (2013.01); *C02F 2209/05* (2013.01); *C02F 2305/023* (2013.01)

(58) Field of Classification Search
CPC .......... C02F 1/463; C02F 1/4608; C02F 1/36; C02F 2101/308; C02F 2103/28; C02F 2305/023; C02F 2209/05; B29C 35/08
See application file for complete search history.

(56) References Cited

U.S. PATENT DOCUMENTS 6,521,134 B1   2/2003  Banerjee et al.
6,572,733 B1   6/2003  Banerjee
(Continued)

OTHER PUBLICATIONS

Joshi, A.A et al., "Formation of Hydroxyl Radicals, Hydrogen Peroxide and Aqueous Electrons by Pulsed Streamer Corona Discharge"; Journal of Hazardous Materials, vol. 41, 28 pgs.
(Continued)

*Primary Examiner* — Walter D Griffin
*Assistant Examiner* — Cameron Allen
(74) *Attorney, Agent, or Firm* — Troutman Sanders LLP; Ryan A. Schneider

(57) ABSTRACT

The disclosed technology includes systems and methods for clustering particles, especially water contaminants, by liquid-phase electric plasma discharge. According to certain implementations, the discharge may be applied continuously, and may be of relatively low power, e.g., a voltage between 300 V and 5000 V and an amperage between 0.1 A and 1 A. The electrodes introducing the electric discharge may be in a point-to-point configuration and with at least one electrode having a large aspect ratio. In some implementations, one or more of the voltage and amperage of the electric discharge, electrode configuration and aspect ratio, and the conductivity of the medium may enable the generation of plasma containing hydroxyl and other radicals. The radicals may catalyze polymerization of the particles, resulting in an increase in particle size and, thus, improved filterability. The polymerization process may continue after the electric discharge is discontinued or removed from influence of the medium.

26 Claims, 9 Drawing Sheets

(51) Int. Cl.
 *C02F 1/46* (2006.01)
 *C02F 1/36* (2006.01)
 *C02F 101/30* (2006.01)
 *C02F 103/28* (2006.01)

(56) References Cited

U.S. PATENT DOCUMENTS

| | | | |
|---|---|---|---|
| 6,749,759 | B2 | 6/2004 | Denes et al. |
| 7,294,233 | B2 | 11/2007 | Banerjee et al. |
| 7,374,688 | B2 | 5/2008 | Banerjee |
| 7,704,401 | B2 | 4/2010 | Ike et al. |
| 2004/0007539 | A1* | 1/2004 | Denes ............... C02F 1/4608 210/748.18 |
| 2006/0060464 | A1 | 3/2006 | Chang |
| 2009/0109141 | A1 | 4/2009 | Murase et al. |

OTHER PUBLICATIONS

Kirkpatrick, Michael J. et al., "Hydrogen, Oxygen, and Hydrogen Peroxide Formation in Aqueous Phase Pulsed Corona Electrical Discharge", Ind. Eng. Chem. Res., vol. 44, 2005, pp. 4243-4248.

Yao, Shuiliang et al., "Methane Conversion Using a High-Frequency Pulsed Plasma: Discharge Features", AIChE Journal, vol. 47, No. 2, Feb. 2001, pp. 419-426.

Miller, Stanley, "The Mechanism of Synthesis of Amino Acids by Electric Discharges", Biochimica et Biophysica Acta, vol. 23, No. 3, 1957, pp. 480-489.

Gao, Jinzhang, "A Novel Technique for Wastewater Treatment by Contact Glow-Discharge Electrolysis", Pakistan Journal of Biological Sciences, vol. 9, No. 2, 2006, pp. 323-329.

Gao, Jinzhang et al., "Degradation of Anionic Dye Eosin by Glow Discharge Electrolysis Plasma", Plasma Science and Technology, vol. 10, No. 4, Aug. 2008, pp. 422-427.

Gao, Jinzhang et al., "Decoloration of Aqueous Brilliant Green by Using Glow Discharge Electrolysis", Journal of Hazardous Materials, vol. B137, 2006, pp. 431-436.

Matyjaszewski, Krzysztof et al., "Atom Transfer Radical Polymerization", Chem. Rev., vol. 101, 2001, pp. 2921-2990.

Fridman, A. et al., "Non-Thermal Atmospheric Pressure Plasma", Advances in Heat Transfer, vol. 40, 2007, pp. 1-142.

Malik, Muhammad et al., "Synthesis of Superabsorbent Copolymers by Pulsed Corona Discharges in Water", Plasmas and Polymers, vol. 8, No. 4, Dec. 2003, pp. 271-279.

* cited by examiner

SYSTEMS AND METHODS FOR CLUSTERING PARTICLES BY LIQUID-PHASE ELECTRIC PLASMA DISCHARGE

CROSS-REFERENCE TO RELATED APPLICATIONS

This application claims priority and the benefit under 35 U.S.C. §119(e) of U.S. Provisional Patent Application No. 61/625,859, filed 18 Apr. 2012, of which the entire contents and substance are hereby incorporated by reference as if fully set forth below.

BACKGROUND

Water contamination is a world-wide problem afflicting both developed and emerging countries. A large contributor to water contamination is the pulp and paper industry. For example, the pulp and paper industry is regarded as the third most polluting industry in North America. The production of paper can have a number of adverse effects on the environment. For example, waste water effluent from a pulp and paper mill may contain toxic inks, dyes and polymers in addition to solids, nutrients, and dissolved organic matter such as lignin. These contaminants frequently find their way into rivers, lakes, and other bodies of water. Moreover, used or discarded paper is a major component of many landfill sites, where paper waste can comingle with groundwater. Even paper recycling can be a source of pollution due to the sludge produced during deinking.

Some techniques currently in use for removing ink and other contaminants include introducing chemical agents to contaminated water in order to cluster and remove particulate matter. In one technique, chemical flocculants are added to water, for example, ferric chloride or ferric sulphate. The resulting flocs can be more readily filtered. In another technique, the photodegradation of titanium dioxide responsive to UV radiation is used to generate free radicals in water. The free radicals can then oxidize organic chemicals. However, these conventional techniques require adding chemical agents or other additional matter such as metal oxides to the water to be decontaminated.

Other conventional techniques include using electricity to cluster contaminants for separation. In one technique, hydrolysis is used to generate bubbles having a negative charge. The bubbles can be selectively targeted at specific particles by leveraging the zeta potential of the particles. In another technique, electrolysis is used to produce coagulating agents, such as metal hydroxides. The coagulating agents can combine with pollutants to form large flocs. Yet another conventional technique involves the creation of atmospheric liquid plasma, for example, by electric discharge, in order to treat or degrade contaminants. However, these conventional techniques typically require discharges of extremely high energy or the injection of gas or air bubbles into the system.

SUMMARY

Some or all of the above deficiencies may be addressed by certain implementations of the disclosed technology. Certain implementations include methods of clustering particles in a medium by energizing the medium with an electric discharge.

According to an example implementation, a method of clustering particles in a medium is provided. The method may include energizing a medium by continuous electric discharge and, responsive to energizing the medium, generating plasma within the medium. The generated plasma may contain free radicals. The method may further include clustering some of the particles in the medium. Clustering may include polymerization of some particles, catalyzed by the free radicals. Thus, clustering may occur responsive to generating the plasma. A voltage and amperage of the electric discharge, and a conductivity of the medium may enable the generation of plasma in the medium, and hence the free radicals.

According to an example implementation, a method of clustering particles in a medium is provided. The method may include energizing a medium by continuous electric discharge. The electric discharge may have a voltage between 300 V and 5000 V, and amperage between 0.1 A and 1 A. The method may further include, responsive to energizing the medium, generating plasma within the medium. The voltage and the amperage of the electric discharge, as well as the conductivity of the medium may enable the generation of plasma in the medium. The method may yet further include, responsive to generating the plasma, clustering at least some of the particles in the medium.

According to an example implementation, a method of clustering particles in a medium is provided. The method may include energizing a medium by continuous electric discharge. The medium may be energized via two or more electrodes, including a first electrode and a second electrode. The first and second electrodes may be a point-to-point configuration. The method may further include, responsive to energizing the medium, generating plasma within the medium. A voltage and amperage of the electric discharge, and a conductivity of the medium may enable the generation of plasma in the medium. The method may yet further include, responsive to generating the plasma, clustering some of the particles in the medium. The clustering may include polymerization of at least some of the particles in the medium.

According to an example implementation, a method of clustering particles in a medium is provided. The method may include energizing a medium by continuous electric discharge, the medium energized via two or more electrodes. The electric discharge may have a voltage between 300 V and 5000 V, and amperage between 0.1 A and 1 A. The two or more electrodes may include a first electrode and a second electrode, the first and second electrodes in a point-to-point configuration. The method may further include, responsive to energizing the medium, generating plasma within the medium. The voltage and amperage of the electric discharge, and the configuration of the two or more electrodes may enable the generation of plasma in the medium.

The generated plasma may contain free radicals. The method may yet further include, responsive to generating the plasma, clustering at least some of the particles in the medium, the clustering including polymerization of some of the particles. The polymerization may be catalyzed by free radicals from the generated plasma. The method may also include filtering some of the clustered particles from the medium. The particles before clustering may have a first average size, and the clustered particles may have a larger second average size. Thus, filtering may allow separation between particles of the first average size and clustered particles of the second average size.

Other implementations, features, and aspects of the disclosed technology are described in detail herein and are considered a part of the claimed disclosed technology. Other implementations, features, and aspects may be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
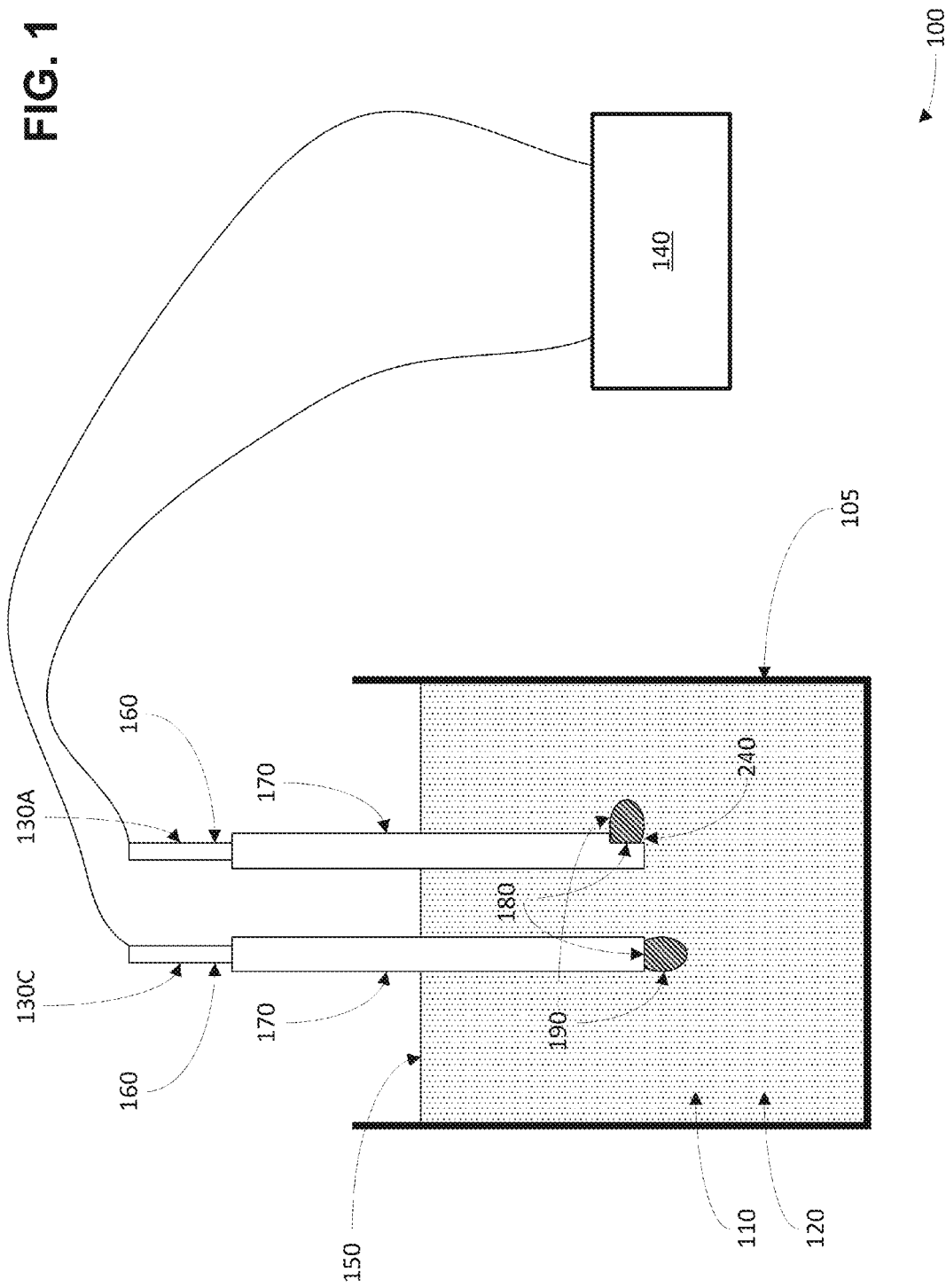
FIG. 1 depicts an illustration of a particle clustering system 100, according to an example implementation.

The disclosed technology includes systems and methods for clustering particles by liquid-phase electric plasma discharge. According to certain implementations, the electric discharge may be applied continuously, and may be of relatively low power, e.g., a voltage between 300 V and 5000 V and an amperage between 0.1 A and 1 A. The electrodes for introducing the electric discharge may be in a point-to-point configuration with one or more of the electrodes having a large aspect ratio. In some implementations, one or more of the voltage and amperage of the electric discharge, electrode configuration and aspect ratio, and the conductivity of the medium may enable the generation of plasma containing hydroxyl and other radicals. In some implementations, the radicals may catalyze polymerization of the particles, resulting in an increase in particle size and, thus, improved filterability. The polymerization process may continue even after the electric discharge is discontinued or removed from the medium.

Accordingly, certain implementations of the disclosed technology may be effective in helping remove particulate contaminants, such as inkjet-printed ink or papermaking stickies, from process water and other contaminated mediums in one aspect; and forming nanoparticles and polymers in another aspect. Other and additional applications of the disclosed technology are contemplated and within the scope of this disclosure.

In describing example implementations, certain terminology will be resorted to for the sake of clarity. It is not intended that the disclosed technology be limited in scope to the details of construction and arrangement of components set forth in the following description or illustrated in the drawings. Rather, the disclosed technology is capable of other implementations and of being practiced or carried out in various ways.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic.

Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

Referring now to the figures, in which like reference numerals represent like parts throughout the views, various implementations of the disclosed technology will be described in detail.

FIG. 1 depicts an illustration of a particle clustering system 100, according to an example implementation. As shown in FIG. 1, the system 100 includes a chamber 105 for housing a mixture 150 of medium 110 and particles 120, and electrodes 130A,C electrically exposed to the medium and operatively connected to a power supply 140.

According to certain implementations, the chamber 105 may be configured for a batch or static process. In an example implementation, as shown in FIG. 1, the chamber may contain a fixed portion of mixture 105 not to be significantly increased, decreased, or exchanged during the energizing of the medium 110 or during the clustering of particles 120. Alternatively, in some implementations, the chamber may be configured for a continuous or dynamic process. In an example implementation, the chamber may be an open chamber permitting the flow of mixture in or out of the chamber, during energizing of a medium or during the clustering process. The flow of mixture through the chamber may be continuous, allowing some implementations to operate, for example, within continuous flow wastewater treatment systems.

The term "mixture" 150, as used herein, includes materials comprising two or more different substances, including solutions, suspensions, colloids, emulsions, etc. According to certain implementations, a mixture may include a medium 110 substantially comprising a first substance, and particulate matter comprising one or more secondary substances, the particulate matter disposed within the medium. For example, in one implementation, the medium may comprise, primarily or at least in part, a fluid such as water. The particulate matter may comprise various contaminants, including particles or liquid droplets, herein referred to collectively as "particles" 120. For example, in some implementations, the particles may include dye- and pigment-based inks or microstickies. The particles may instead or also include organic chemicals, metals, soil or dust particles, etc.

A mixture 150 need not be of high purity. In some implementations, the disclosed methods may be applied effectively to mixtures of liquids containing up to approximately 25% solid matter. Thus, these implementations may be well suited for treating process or waste water from industrial, institutional, commercial, or domestic sources; contaminated ground water, rainwater, or runoff; or various other impure materials.

In some implementations, the particles 120 of the mixture 150 generally may be microscopic prior to clustering, for example, having an average size on a micronic or submicronic scale. These types or particles may be difficult to filter conventionally, for example, as particles finer than 0.1 μm ($10^{-7}$ m) in water tend to remain in continuous motion due to electrostatic charge. However, in some implementations, the average size of the particles may be macroscopic prior to clustering.

In some implementations, the particles 120 of the mixture 150 may be partially to completely undissolved in the medium 110 prior to clustering. For example, the particles may be insoluble in the medium, wherein the term "insoluble" is used herein to refer to poorly or very poorly soluble compounds. In other implementations, the particles may be completely or substantially dissolved in the medium prior to clustering.

Electrodes 130A,C for energizing the medium 110 may be electrically exposed to the medium. In some implementations, all or a portion of each electrode may be at least partially submersed in the medium. Each electrode may have one or more insulating parts 170, as well as one or more conductive parts 160, at least a portion of the conductive parts exposed to or in contact with the medium 180. The electrodes may be operatively connected to one or more power supplies 140. In some implementations, the power supplies may be configured to provide an electric current at a fixed voltage and amperage.

The system 100 operates by energizing a medium 110 by electric discharge. The electric discharge may generate plasma within the medium, causing particles 120 in the medium to cluster. FIG. 1 shows plasma regions 190 generated around the exposed conductive portions of the electrodes 180. Clustering the particles may increase their average size, allowing the clustered particles to be more easily manipulated, such as in removal by filtration. "Clustering" as used herein, refers generally to the gathering or bunching of particles, and includes agglomeration, flocculation, bonding, etc. Clustering may be achieved by one or more of chemically or physically altering a portion of the particles, for example, by altering the surface chemistry or charge associated with the particle, or by chemical reactions between particles.

According to certain implementations, clustering of particles 120 may include polymerization of at least some of the particles. In some implementations, the generated plasma may comprise free radicals, for example, hydroxyl radicals. These radicals may initiate polymerization reactions between active species. In an example implementation, polymerization of the particles may be initiated, or catalyzed, by the free radicals. Moreover, in some implementations, a supply of free radicals may not be consumed or exhausted by initiating polymerization. Thus polymerization initiated by free radicals may continue after the medium 110 is no longer being energized. In an example implementation, additional particles added to an already treated medium may continue to cluster after exposure to the treated medium without the need to re-energize the medium. Moreover, free radicals generated local to an electric discharge in a continuous flow system may still effectively initiate polymerization downstream or outside the influence of the electric discharge.

Radical-initiated polymerization enables some implementations of the disclosed technology to be extremely effective at polymerizing ink. One reason may be that many ink molecules have a large amount of alkene bonds. Because of these bonds, when two ink molecules that each have a free radical meet, the molecules may not necessarily cause a termination event in the polymerization process. Another reason may be that many of the molecules in ink are high molecular weight compounds and are likely to have carbon-hydrogen bonds that are very weak and easy for the plasma to break in order to create a free radical. In some implementations, the electric discharge may replace or supplement the need for a radical initiator in the polymerization process.

According to certain implementations, the electric discharge may be a continuous electric discharge at a substantially fixed voltage and amperage. In other implementations, the electric discharge may be pulsed, or the voltage and amperage may be adjusted through a range of values. In some implementations, the electric discharge may be of high voltage and low amperage. For example, suitable ranges of voltage and amperage for use with the disclosed technology include voltages between 300 V and 5,000 V and amperages between 0.1 A and 1 A. In particular, the electric discharge may have a voltage between 1,000 V and 3,000 V, and amperage between 0.25 A and 0.60 A.

Moreover, in the experimental setup later described herein, the electric discharge has a voltage of approximately 2,500 V and an amperage of approximately 0.40 A. This implies an example power of about 1000 W. This example power is relatively low compared to the power used in conventional techniques relying on electric discharges to cluster or remove contaminants from water. Accordingly, in some implementations, and as shown in FIG. 1, the electric discharge may be a corona discharge resulting in plasma regions 190 local to the exposed conductive portions of the electrodes 180. Alternatively, in another implementation, the electric discharge may be a spark between exposed conductive portions of two electrodes. However, a spark may occur when the plasma region occupies an entire space between two electrodes. This may cause the amperage to increase dramatically requiring increased power.

The amperage required to effectively generate plasma in a medium 110 may also scale with the conductivity of the medium. Accordingly, as the conductivity of a medium increases, so may the current required. For the experimental data provided below, 2500 V and 0.4 A was used to energize a medium with conductivity of approximately 200 μS/cm. In comparison, the average conductivity of tap water is about 500 μS/cm.

According to certain implementations, the electrodes 130A,C may include a first 130C electrode and a second electrode 130A, as shown in FIG. 1 (e.g., a cathode and anode). In an example implementation, the first and second electrodes may be in a point-to-point configuration, wherein the surface area of the exposed conductive part 180 of each of the electrodes is similar, or of approximately the same magnitude. This configuration may allow for the formation of plasma at each electrode. In another implementation, each electrode may be substantially formed of an elongated member, as shown in FIG. 1.

In some implementations, the electrodes 130A,C may have one or more insulating parts 170, as well as one or more conductive parts 160. In an example implementation, an insulating part may be a ceramic shell or sleeve, and a conducting part may be a metallic rod partially covered by the insulating parts. At least a portion of the conductive parts may be exposed to, or in contact with, the medium 110 to be energized. For example, in one implementation, as shown in FIG. 1, an insulating part may not cover the end of an electrode, allowing a portion of the exposed conductive part 180 at the bottom of the electrode to interface electrically with a medium. Accordingly, the exposed conductive part of the electrode may have a substantially elliptical area or cross section.

In another example implementation, a special cut-out 240 may expose the conductive electrode part to the medium 110. As shown in FIG. 1, in some implementations, the cut-out may be near a distal end of the electrode (see 130A). In an example implementation, the area exposed by the cut-out may be substantially rectangular in shape and have a length and width. The ratio of length to width of the surface area of an exposed conductive part of an electrode 180 is referred to herein as the "aspect ratio." As an increase in the surface area of an exposed conductive part may cause an increase in power required to generate plasma, the use of a high aspect ratio allows for high free radical generation with a relatively low amount of energy. In some implementations, the aspect ratio may be at least 3. However, a higher aspect ratio of 10 or more produced a significant increase in hydroxyl radicals during experiments.

In some implementations, the first electrode 130C may have an exposed conductive part at the end of the first electrode with a substantially elliptical surface area and the second electrode 130A may have a cut-out 240 exposing a conductive part with a substantially rectangular surface area. In a further implementation, the first electrode may be a cathode and the second electrode may be an anode. In another implementation, each of the electrodes 130A,C may have cut-outs. Other electrode configurations are contemplated and within the scope of this disclosure.

Figure 2:
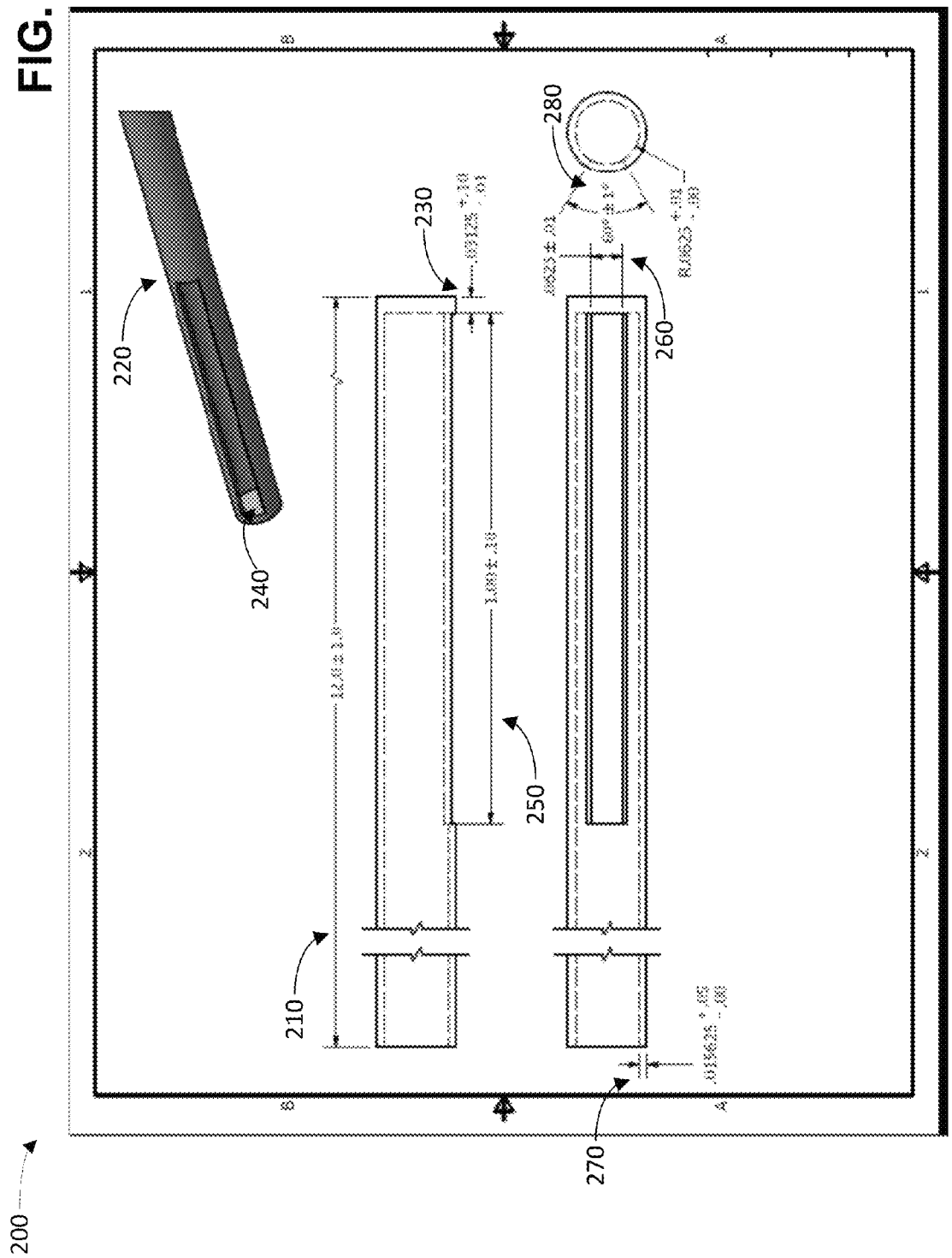
FIG. 2 depicts illustrations of an electrode design 200, according to an example implementation.

FIG. 2 depicts illustrations of an electrode design 200, according to an example implementation. As shown in FIG. 2, a suitable electrode 130 may be created from a metal rod (not shown) inserted into a ceramic tube 220. In this example, the ceramic tube has a length 210 of approximately 12 inches and a thickness 270 of approximately 0.0156 inches. The ceramic tube also has a portion of the side cut out, in order to expose a part of the inserted metal rod. The angle subtended by the cut-out may determine the width of the exposed area. In this example, the cut-out 240 subtends an angle 280 of approximately 60 degrees. Accordingly, the exposed portion of the metal rod may resemble a convex rectangle, or have a substantially rectangular cross section. In this example, the exposed portion has a length 250 of approximately one inch, and width 260 of approximately 0.0625 inches, resulting in an aspect ratio of 16.

In another example implementation, the length and width of a cut-out 240 may be approximately 0.787 and 0.01, respectively. The metal rod may have a diameter of approximately 0.064 inches.

According to certain implementations, the clustered particles may be separated from the mixture 150 or medium 110. In some implementations, removing clustered particles may include filtering the clustered particles from the medium 110. As clustering the particles may result in clusters with greater average size than the un-clustered particles, the disclosed techniques may enable the clustered particles to be effectively removed by filtration, especially by filters permeable to the un-clustered particles. For example, in one scenario, particles prior to clustering may by submicronic. After clustering, the clustered particles may be supermicronic. A micronic filter ineffective at filtering the submicronic particles may effectively strain the supermicronic clusters. In another example, particles that are microscopic on average prior to clustering may form macroscopic clusters.

In some implementations, the particles 120 may be bound to other substances in the medium 110. Ultrasonification or other techniques may be used during treatment to assist in the freeing of ink and other contaminants from these substances, for example, fiber surfaces, to assist in the clustering and removal process.

The following examples and experimental data demonstrate the ability of some implementations of the disclosed electric discharge technique to polymerize ink for filtration. A two electrode system was used, the anode having a rectangular cut-out and the cathode being exposed only at the very end of the electrode, as shown in FIG. 1. The general procedure followed for these experiments included subjecting a volume of ink and water solution to the plasma process, and then filtering the solution with a 0.8 micron filter, the porosity of which was well above the original particle size of the ink. Then, absorbance measurements were taken at various time intervals to demonstrate that the process could effectively remove ink from water using this method. The voltage and amperage used for all the experiments was 2500 V and 0.4 A, respectively, and the conductivity of the solution was approximately 200 μS/cm. Even though the process was effective within the first 10 minutes of the discharge, additional time points were taken to demonstrate the process was stable.

Figure 3:
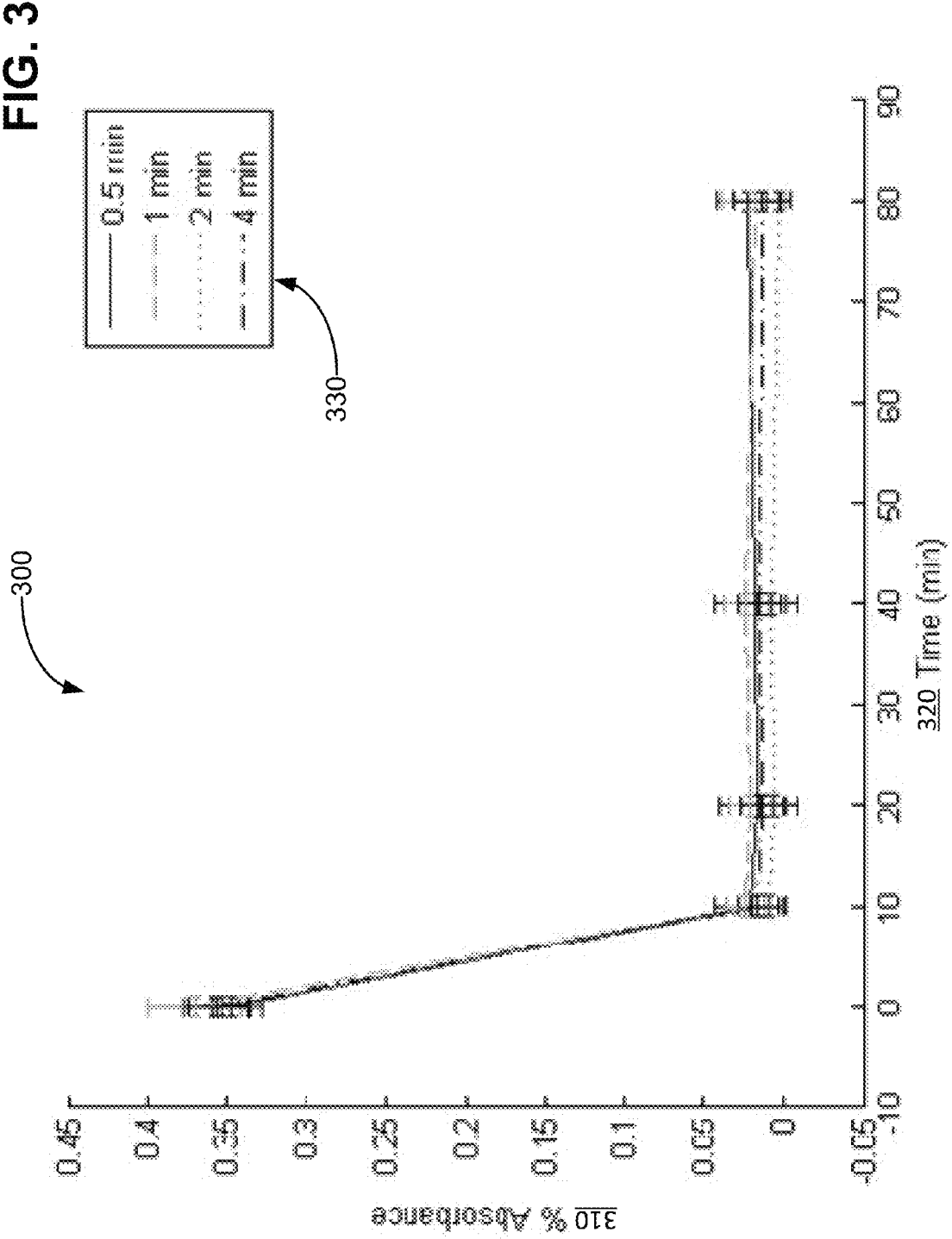
FIG. 3 depicts a graph 300 of absorbance readings after filtration for various electric discharge periods 330, according to an example implementation.

FIG. 3 depicts a graph 300 of absorbance readings after filtration for various electric discharge periods 330, according to an example implementation. In this example, one liter of ink water mixture was made using 0.2 grams of ink per liter (g/L) and the plasma process was run with various discharge periods 330 between 0.5 minutes and 4 minutes long. The graph 300 shows the absorbance 310 readings at filtration time intervals 320 after each electric discharge period. FIG. 3 demonstrates the efficacy of the polymerization process on inkjet ink, as the results show the length of the discharge period did not play a significant role in absorbance at any filtration time. Accordingly, the graph suggests that more than sufficient power was used during this experiment to catalyze the ink polymerization process.

Figure 4:
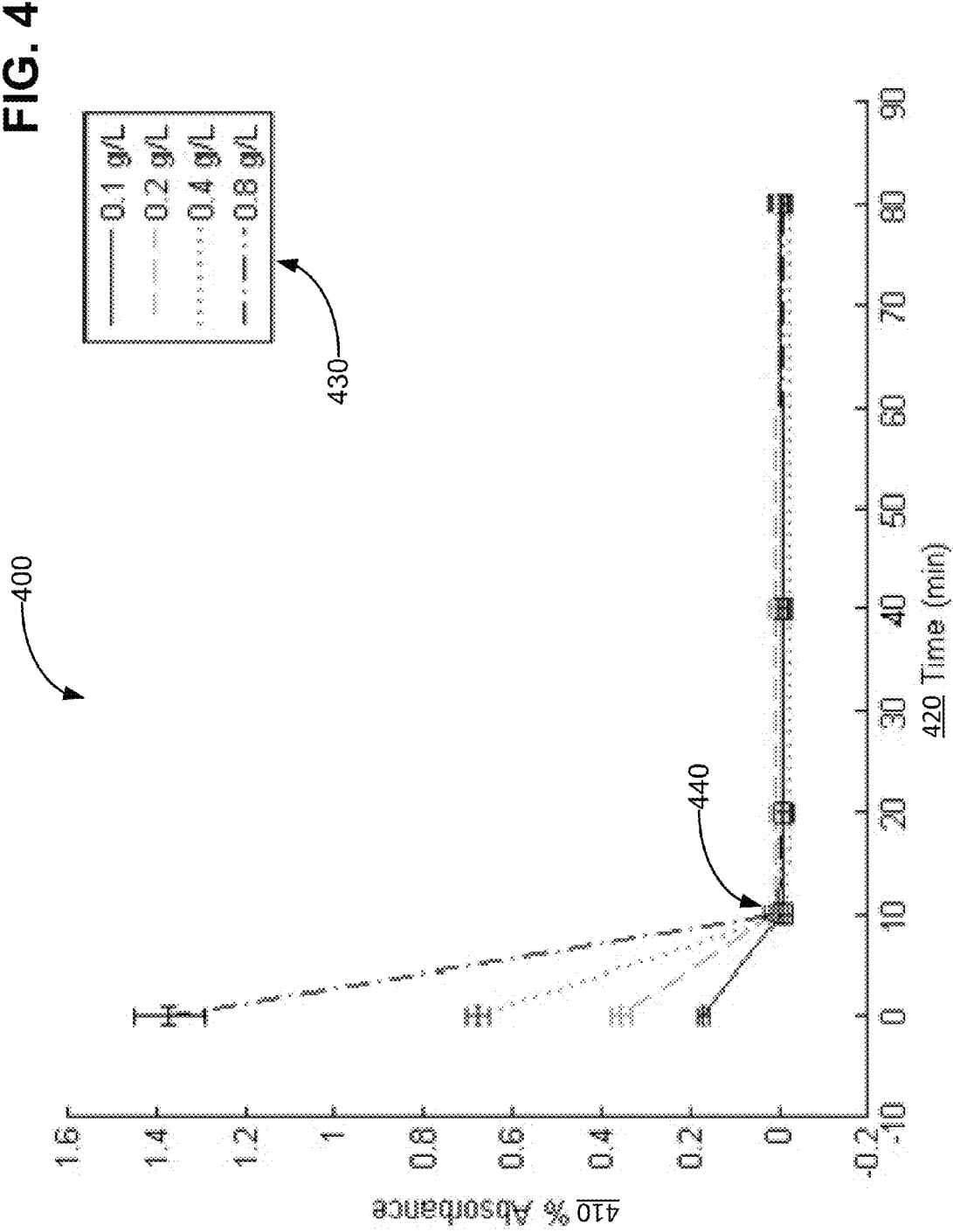
FIG. 4 depicts a graph 400 of absorbance readings after filtration for various ink concentrations 430, according to an example implementation.

FIG. 4 depicts a graph 400 of absorbance readings after filtration for various ink concentrations 430, according to an example implementation. In this example, the process was nearly the same as in the previous example, except that the electric discharge period was held constant at two minutes and the concentration of ink 430 was varied from 0.1 g/L to 0.8 g/L. As shown in FIG. 4, the amount of ink used did not change the ultimate efficacy of the process, as the absorbance 410 readings for each concentration converge around a time 420 of 10 minutes 440. This result again suggests that the amount of energy used was more than sufficient to polymerize the ink for filtration from water.

In another experiment, the plasma process was confirmed to generate free radicals by applying the electric discharge to a methanol solution. Using gas chromatography-mass spectrometry (GC-MS), ethane-1,2-diol was observed in the solution after the electric discharge was applied. It is clear that free radicals were formed during the plasma process, as ethane-1,2-diol could only be formed through a free radical mechanism, as opposed to a cationic or anionic polymerization mechanism. Briefly explained, if the process were cationic, electrons could not form a sigma bond with another carbon, since the electrons would all be tied up in the bonds to hydrogen and oxygen; if the process was anionic, there would be no space in the orbitals for a sigma bond to form.

However, with the free radical process, because there is one electron and one orbital with space to accept another electron, the free radical can react with another free radical to form a sigma bond.

Figure 5:
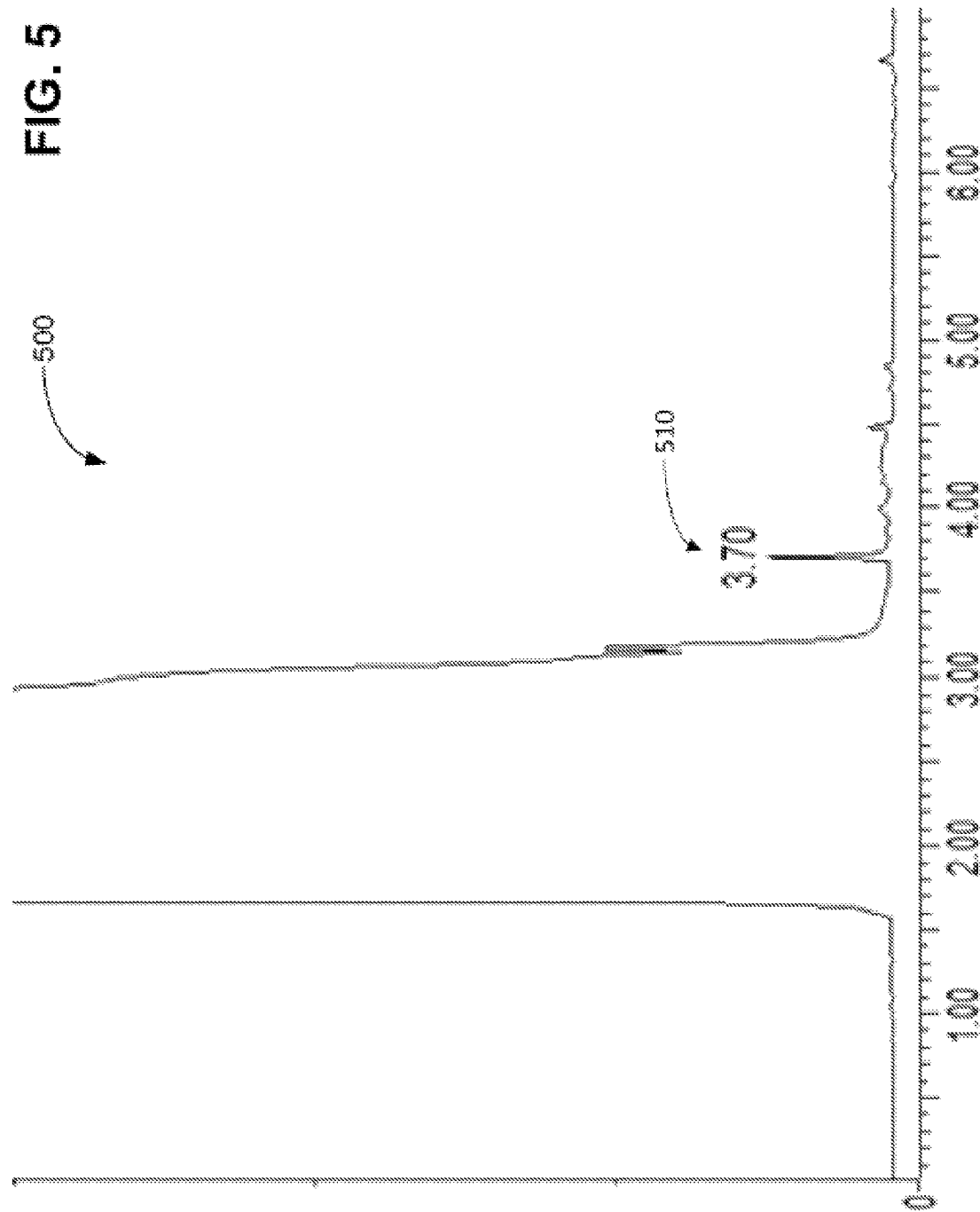
FIG. 5 depicts an ion chromatogram 500 for a blank control sample after exposure to the discharge process, according to an example implementation.
Figure 6:
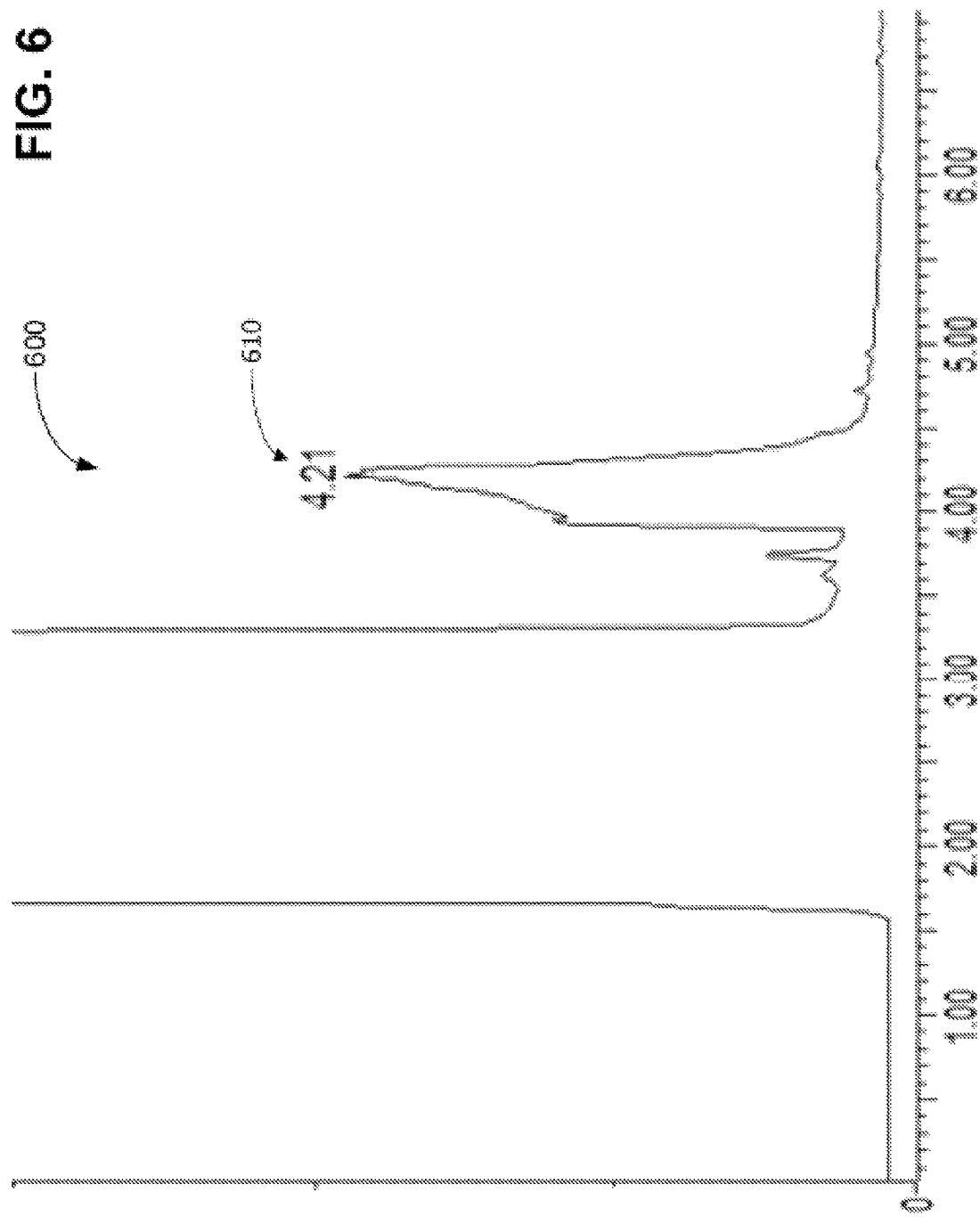
FIG. 6 depicts an ion chromatogram 600 for methanol after exposure to the discharge process, according to an example implementation.
Figure 7:
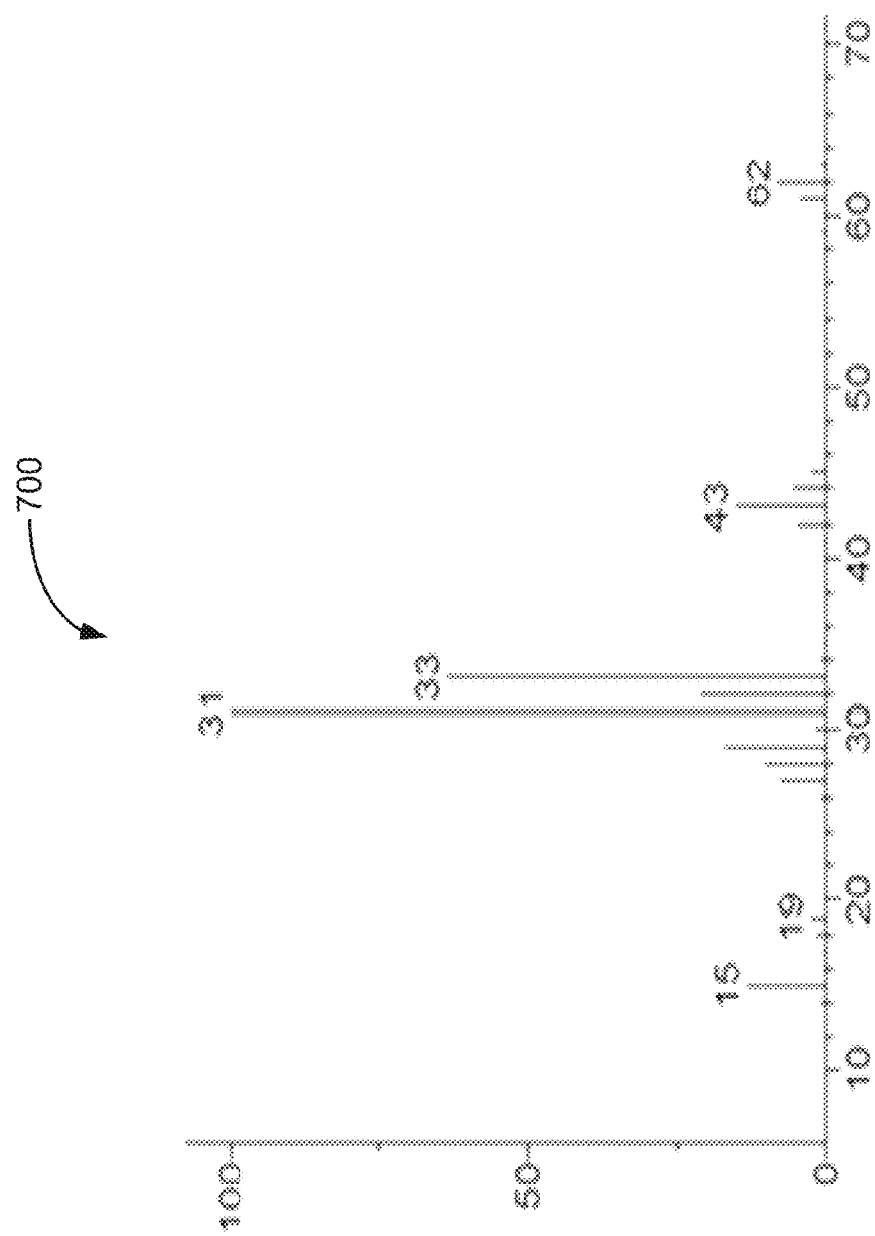
FIG. 7 depicts an experimentally measured spectra 700 for ethane-1,2-diol, according to an example implementation.
Figure 8:
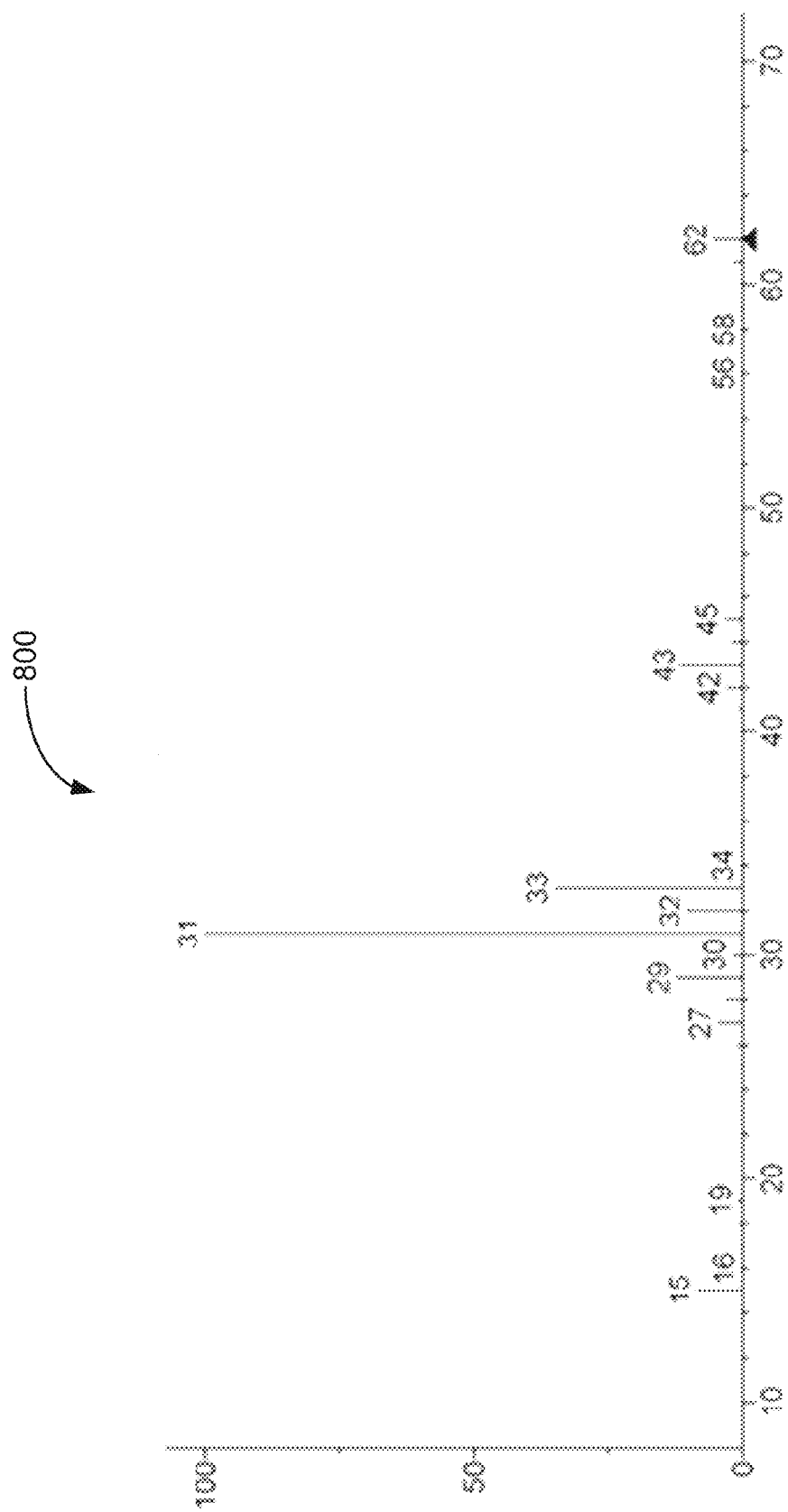
FIG. 8 depicts a NIST Library spectra 800 for ethane-1,2-diol, according to an example implementation.

FIGS. 5-6 show that ethane-1,2-diol was present in the methanol solution after the electric discharge. FIG. 5 depicts an ion chromatogram 500 for a blank control sample after exposure to the discharge process, according to an example implementation. The peak at 3.7 minutes 510 was identified as a contaminant from another run using this GC-MS, and it eluded off the column as a result of using a split-less trial. FIG. 6 depicts an ion chromatogram 600 for methanol after exposure to the discharge process, according to an example implementation. The second peak at 4.21 minutes 610 is mainly comprised of ethane-1,2-diol. For comparison, the spectra of both the second peak in this total ion chromatogram, and the spectra of ethane-1,2-diol in the NIST library is shown in FIGS. 7-8, respectively. The comparison of these graphs, 700 and 800, clearly shows that the disclosed plasma process generated free radicals for the disclosed parameters.

Figure 9:
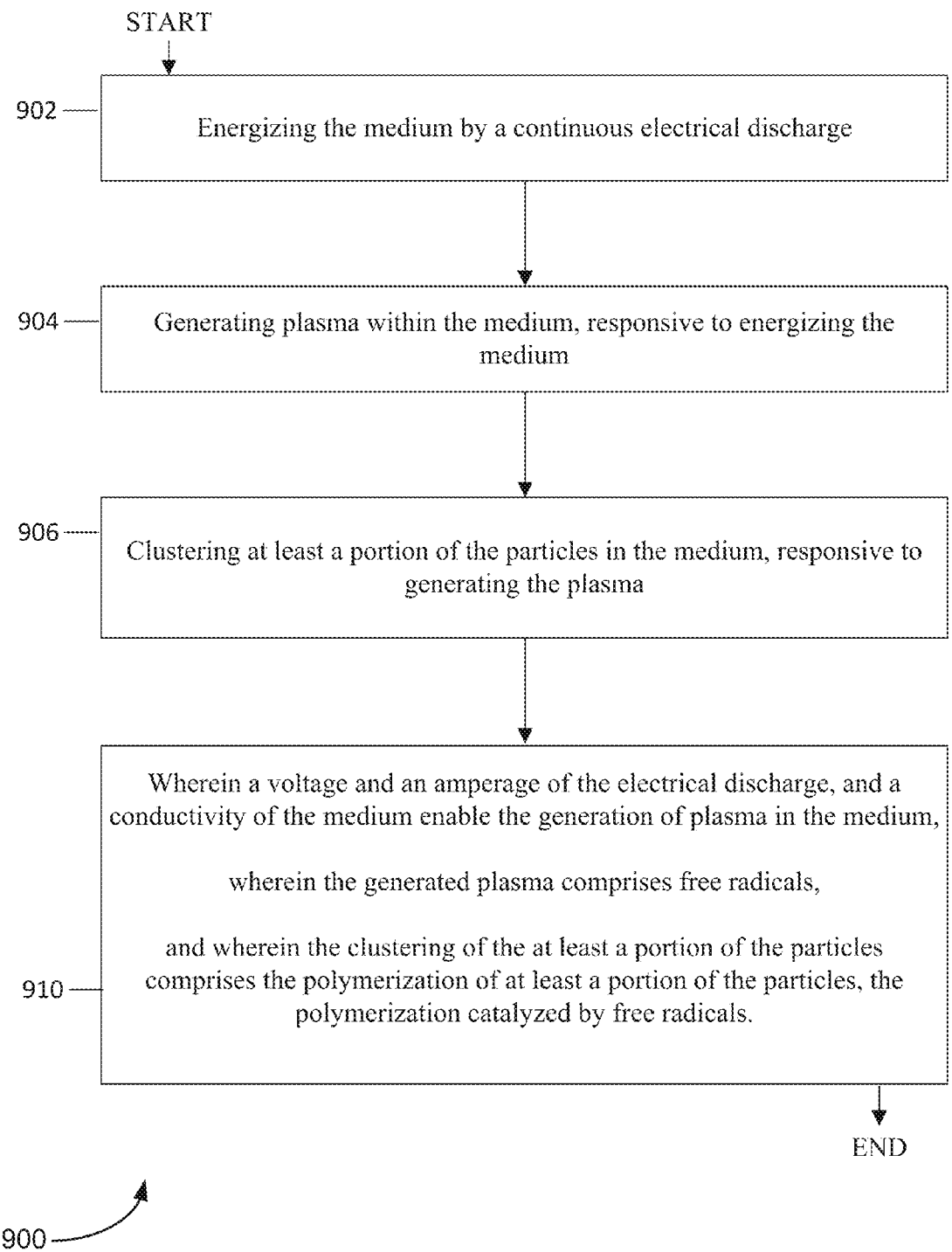
FIG. 9 depicts a method 900 for clustering particles in a medium by energizing the medium with an electric discharge, according to an example implementation.

FIG. 9 depicts a method 900 for clustering particles in a medium by energizing the medium with an electric discharge, according to an example implementation. As shown in FIG. 9, the method 900 starts in block 902, and according to an example implementation includes, energizing the medium by a continuous electric discharge. In block 904, the method 900 includes, generating plasma within the medium, responsive to energizing the medium. In block 906, the method 900 includes, clustering at least a portion of the particles in the medium, responsive to generating the plasma. In block 908, the method 900 includes, wherein a voltage and an amperage of the electric discharge, and a conductivity of the medium enable the generation of plasma in the medium; wherein the generated plasma comprises free radicals; and wherein the clustering of the at least a portion of the particles comprises the polymerization of at least a portion of the particles, the polymerization catalyzed by free radicals.

It will be understood that the various steps shown in FIG. 9 are illustrative only, and that steps may be removed, other steps may be used, or the order of steps may be modified.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of clustering particles in a medium comprising:
    energizing the medium by a continuous electric discharge;
    generating plasma within the medium, responsive to energizing the medium;
    clustering at least a portion of the particles in the medium, responsive to generating the plasma;
    stopping the energizing of the medium;
    adding additional particles to the medium; and
    catalyzing, by free radicals, polymerization of at least a portion of the additional particles;
    wherein a voltage and an amperage of the continuous electric discharge, and a conductivity of the medium enable the generation of plasma in the medium;
    wherein the generated plasma comprises free radicals;
    wherein the clustering of the at least a portion of the particles comprises the polymerization of at least a portion of the particles, the polymerization catalyzed by free radicals.

2. The method of claim 1, wherein the particles are undissolved in the medium prior to clustering.

3. The method of claim 1, wherein the particles are insoluble in the medium.

4. The method of claim 1, wherein the medium substantially comprises a liquid.

5. The method of claim 4, wherein the liquid is water.

6. The method of claim 1 further comprising continuing the polymerization of at least a portion of the particles.

7. The method of claim 1, wherein the free radicals substantially comprise hydroxyl radicals.

8. A method of clustering particles in a medium comprising:
    energizing the medium by an electric discharge;
    generating plasma within the medium, responsive to energizing the medium;
    clustering at least a portion of the particles in the medium, responsive to generating the plasma;
    stopping the energizing of the medium;
    adding additional particles to the medium; and
    catalyzing, by free radicals, polymerization of at least a portion of the additional particles;
    wherein the electric discharge is at a voltage between 300 V and 5000 V and an amperage between 0.1 A and 1 A;
    wherein the voltage and the amperage of the electric discharge, and a conductivity of the medium enable the generation of plasma in the medium.

9. The method of claim 8, wherein the electric discharge is at a voltage between 1000 V and 3000 V and an amperage between 0.25 A and 0.60 A.

10. The method of claim 8, wherein the electric discharge has a power of approximately 1000 W.

11. The method of claim 8, wherein the electric discharge is at a voltage of approximately 2,500 V and an amperage of approximately 0.40 A.

12. The method of claim 8, wherein the conductivity of the medium is between 200 µS/cm and 500 µS/cm.

13. The method of claim 8, wherein the medium substantially comprises water.

14. A method of clustering particles in a medium comprising:
    energizing the medium by an electric discharge;
    generating plasma within the medium, responsive to energizing the medium; and
    clustering at least a portion of the particles in the medium, responsive to generating the plasma;

wherein the medium is energized via two or more electrodes, including a first electrode and a second electrode, the first electrode and the second electrode being in a point-to-point configuration;

wherein at least a portion of the second electrode is in electrical contact with the medium, the portion of the second electrode in electrical contact with the medium being disposed at the end of the second electrode and having a substantially elliptical surface area;

wherein the clustering of the at least a portion of the particles comprises polymerization of at least a portion of the particles; and wherein a voltage and an amperage of the electric discharge, a conductivity of the medium, and the configuration of the two or more electrodes enable the generation of plasma in the medium.

15. The method of claim 14, wherein the first electrode and the second electrode are each substantially formed of an elongated member.

16. The method of claim 14, wherein at least a portion of the first electrode is in electrical contact with the medium, the portion of the first electrode in electrical contact being disposed on the side of the first electrode.

17. The method of claim 14, wherein the first electrode is an anode.

18. The method of claim 16, wherein a surface area of the portion of the first electrode in contact with the medium is substantially rectangular.

19. The method of claim 18, wherein the surface area has a length and a width, the ratio of the length to the width being at least 10.

20. A method of clustering particles in a medium comprising:

energizing the medium by an electric discharge;

generating plasma within the medium, responsive to energizing the medium; and clustering at least a portion of the particles in the medium, responsive to generating the plasma;

wherein the medium is energized via two or more electrodes, including a first electrode and a second electrode, the first electrode and the second electrode being in a point-to-point configuration;

wherein the clustering of the at least a portion of the particles comprises polymerization of the at least a portion of the particles;

wherein a voltage and an amperage of the electric discharge, a conductivity of the medium, and the configuration of the two or more electrodes enable the generation of plasma in the medium;

wherein the first electrode and the second electrode each have a portion of the electrode in electrical contact with the medium; and wherein a total surface area of the portions in electrical contact is between 0.01 and 0.1 square inches.

21. A method of clustering particles in a medium comprising:

energizing the medium by an electric discharge;

generating plasma within the medium, responsive to energizing the medium; and clustering at least a portion of the particles in the medium, responsive to generating the plasma;

wherein the medium is energized via two or more electrodes, including a first electrode and a second electrode, the first electrode and the second electrode being in a point-to-point configuration;

wherein the clustering of the at least a portion of the particles comprises polymerization of the at least a portion of the particles;

wherein a voltage and an amperage of the electric discharge, a conductivity of the medium, and the configuration of the two or more electrodes enable the generation of plasma in the medium;

wherein the first electrode and the second electrode each have a portion of the electrode in electrical contact with the medium; and wherein a total surface area of the portions of the first electrode and the second electrode in electrical contact with the medium is approximately 0.03 square inches.

22. A method of reducing a density of particles in a medium comprising:

energizing the medium by a continuous electric discharge at a voltage between 300 V and 5000 V and an amperage between 0.1 A and 1 A, the medium energized via two or more electrodes including a first electrode and a second electrode, the first and second electrodes in a point-to-point configuration;

generating plasma within the medium responsive to energizing the medium, the plasma comprising free radicals;

responsive to generating the plasma, clustering at least a portion of the particles in the medium; and filtering at least a portion of the clustered particles from the medium;

wherein the clustering at least a portion of the particles comprises polymerization of the at least a portion of the particles, the polymerization catalyzed by free radicals;

wherein the at least a portion of the particles have a first average size and the clustered particles have a second average size greater than the first average size;

wherein filtering is performed using a filter substantially permeable to particles of the first average size but not the second average size;

wherein the voltage and the amperage of the continuous electric discharge and the configuration of the two or more electrodes enable the generation of plasma in the medium; and wherein the medium and the particles substantially comprise paper mill effluent.

23. A method of clustering particles in a medium comprising:

energizing the medium by a continuous electric discharge;

generating plasma within the medium, responsive to energizing the medium; and clustering at least a portion of the particles in the medium, responsive to generating the plasma;

wherein a voltage and an amperage of the continuous electric discharge, and a conductivity of the medium enable the generation of plasma in the medium;

wherein the generated plasma comprises free radicals;

wherein the clustering at least a portion of the particles comprises polymerization of the at least a portion of the particles, the polymerization catalyzed by free radicals;

wherein the at least a portion of the particles prior to clustering has a first average size and the clustered at least a portion of the particles have a second average size greater than the first average size; and wherein the first average size is submicronic, and the second average size is supermicronic.

24. A method of clustering particles in a medium comprising:
  energizing the medium by a continuous electric discharge;
  generating plasma within the medium, responsive to energizing the medium; and
  clustering at least a portion of the particles in the medium, responsive to generating the plasma;
  wherein a voltage and an amperage of the continuous electric discharge, and a conductivity of the medium enable the generation of plasma in the medium;
  wherein the generated plasma comprises free radicals;
  wherein the clustering at least a portion of the particles comprises the polymerization of at least a portion of the particles, the polymerization catalyzed by free radicals;
  wherein the at least a portion of the particles prior to clustering has a first average size and the clustered at least a portion of the particles have a second average size greater than the first average size; and
  wherein the first average size is microscopic, and the second average size is macroscopic.

25. A method of reducing a density of particles in a medium comprising:
  energizing the medium by a continuous electric discharge at a voltage between 300 V and 5000 V and an amperage between 0.1 A and 1 A, the medium energized via two or more electrodes including a first electrode and a second electrode, the first and second electrodes in a point-to-point configuration;
  generating plasma within the medium responsive to energizing the medium, the plasma comprising free radicals;
  responsive to generating the plasma, clustering at least a portion of the particles in the medium; and
  filtering at least a portion of the clustered at least a portion of the particles from the medium;
  wherein the clustering at least a portion of the particles comprises polymerization of the clustered at least a portion of the particles, the polymerization catalyzed by free radicals;
  wherein the at least a portion of the particles prior to clustering has a first average size and the clustered at least a portion of the particles have a second average size greater than the first average size;
  wherein filtering is performed using a filter substantially permeable to particles of the first average size but not the second average size;
  wherein the voltage and the amperage of the electric discharge, and the configuration of the two or more electrodes enable the generation of plasma in the medium; and
  wherein the particles substantially comprise one or more of pigmented ink and microstickies.

26. A method of reducing a density of particles in a medium comprising:
  energizing the medium by a continuous electric discharge at a voltage between 300 V and 5000 V and an amperage between 0.1 A and 1 A, the medium energized via two or more electrodes including a first electrode and a second electrode, the first and second electrodes in a point-to-point configuration;
  generating plasma within the medium responsive to energizing the medium, the plasma comprising free radicals;
  responsive to generating the plasma, clustering at least a portion of the particles in the medium; and
  filtering at least a portion of the clustered at least a portion of the particles from the medium;
  wherein the clustering at least a portion of the particles comprises polymerization of the at least a portion of the particles, the polymerization catalyzed by free radicals;
  wherein the at least a portion of the particles prior to clustering has a first average size and the clustered at least a portion of the particles have a second average size greater than the first average size;
  wherein filtering is performed using a filter substantially permeable to particles of the first average size but not the second average size;
  wherein the voltage and the amperage of the electric discharge and the configuration of the two or more electrodes enable the generation of plasma in the medium; and
  wherein the medium is energized by ultrasonification.

* * * * *